United States Patent
Coffman et al.

(10) Patent No.: US 9,673,601 B2
(45) Date of Patent: Jun. 6, 2017

(54) CABLE PROTECTOR WITH EXPANDABLE CENTER SECTION

(71) Applicant: Checkers Industrial Products, LLC, Broomfield, CO (US)

(72) Inventors: Daniel Coffman, Northglenn, CO (US); Greg Lundeen, Broomfield, CO (US)

(73) Assignee: CHECKERS INDUSTRIAL PRODUCTS, LLC, Broomfield, CO (US)

( * ) Notice: Subject to any disclaimer, the term of this patent is extended or adjusted under 35 U.S.C. 154(b) by 86 days.

(21) Appl. No.: 14/735,734

(22) Filed: Jun. 10, 2015

(65) Prior Publication Data

US 2016/0365715 A1    Dec. 15, 2016

(51) Int. Cl.
    *H02G 3/04*      (2006.01)
    *H02G 3/30*      (2006.01)
    *H02G 3/38*      (2006.01)

(52) U.S. Cl.
    CPC .................................. *H02G 3/385* (2013.01)

(58) Field of Classification Search
    CPC .......... H02G 3/263; H02G 3/385; H02G 3/26; H02G 3/22; H02G 3/30; H02G 3/32; H02G 3/36; H02G 3/38; H02G 9/00; H02G 9/02
    USPC .... 174/101, 135, 97, 70 C, 70 R, 68.1, 68.3, 174/95; 248/74.1, 74.2, 68.1; 14/69.5
    See application file for complete search history.

(56) References Cited

U.S. PATENT DOCUMENTS

| | | | | |
|---|---|---|---|---|
| 6,481,036 | B1 * | 11/2002 | Duvall ..................... | H02G 9/02 104/275 |
| 7,145,078 | B2 * | 12/2006 | Henry ...................... | H02G 9/04 174/72 C |
| 7,145,079 | B1 * | 12/2006 | Henry ..................... | H02G 9/025 174/72 C |
| 7,838,772 | B2 * | 11/2010 | Lubanski ................ | H02G 9/025 174/72 C |
| 7,943,851 | B2 * | 5/2011 | Lubanski ................ | H02G 9/025 174/68.1 |
| 8,001,643 | B1 * | 8/2011 | James ...................... | H02G 9/04 174/68.1 |
| 8,119,914 | B2 * | 2/2012 | Lubanski ................ | H02G 9/025 174/68.1 |
| 8,309,850 | B2 * | 11/2012 | Henry .................. | H01R 25/161 174/68.1 |
| 8,791,363 | B2 * | 7/2014 | Lubanski ................ | H02G 9/025 174/72 C |

* cited by examiner

*Primary Examiner* — Angel R Estrada
(74) *Attorney, Agent, or Firm* — Holland & Hart

(57) ABSTRACT

Cable protectors and related methods are provided for protecting cables while being positioned between raised floor panels. The cable protector has a base portion having at least one receptacle channel configured to receive a cable, wherein the at least one receptacle channel is positioned between a first side ridge and a second side ridge that each extend vertically to different heights relative to the at least one receptacle channel. The cable protector also has a cover panel mounted to the base portion and supported by the first and second side ridges. The cover panel covers the at least one receptacle channel at a non-orthogonal angle with respect to the vertical direction. Other cable protectors disclosed have a modular design or a feature for connection to adjacent floor panels having differing heights or interlocking designs.

29 Claims, 10 Drawing Sheets

CABLE PROTECTOR WITH EXPANDABLE CENTER SECTION

TECHNICAL FIELD

The present disclosure generally relates to cable protection and management systems and particularly relates to a cable protection and management system for use with adjacent ground protection panels.

BACKGROUND

Stadium and arena fields and other play surfaces are developed, maintained, and manicured with a high level of care and at a high cost to stadium and arena management. Thus, managers go to great lengths to protect and preserve the fields and play surfaces when the public or ticketholders are brought into the venue for events such as concerts. In order to prevent pedestrian or vehicle traffic from trampling or otherwise destroying grasses, damaging manicured dirt surfaces, and/or preventing marring to polished surfaces, a network of durable interlocking ground protection panels may be placed on the ground before the event. In some cases, the flooring panels are transparent or translucent so that sunlight can reach and nourish living grass below the surface. The ground protection panels support the load of the patrons of the venue and separate traffic from the sensitive surfaces underneath until the event is over. The panels are then removed and damage or wear to the field or play surface is limited.

It is common for events to need to route cables across the areas where patrons and vehicles will be traveling for the event. For example, at a concert, many cables need to be routed from the stage to a sound and mixing booth which is typically in front of the stage and separated from the stage by the ground protection panels covering the ground where concertgoers will be seated or standing during the show. These cables would be damaged if routed underneath the ground protection panels, and, due to interlocking, the panels do not have spaces in between for cables to pass. Also, even if there were spaces between the panels, the panels then would not effectively protect the ground surface from damage. Thus, to span the distance to the stage, the cables are routed over the top surfaces of the panels or routed over long distances around the crowd. Generally, routing over the top surfaces is preferred in order to reduce the required amount of cabling and setup.

Gaffer tape is commonly used to secure the positions of the cables to the floor panels so that the cables are not moved by the movement of people or vehicles on the floor panels, but the tape is not effective enough at protecting the cables from the customers (or vice versa). Depending on the number of cables and their thicknesses, taped-down cables may prevent wheelchair traffic, may pose a tripping hazard for pedestrians, and are not protected well enough from crush damage due to the weight of people or vehicle traffic. The tape may also come loose, further increasing damage and danger for the cables and people in the area that can also lead to audio, video, or power failures. Accordingly, there is a need for improvements in protection of cables where protective floor panels are used.

SUMMARY

One aspect of the present disclosure relates to a cable protector for positioning between raised floor panels. The cable protector may include a base portion having at least one receptacle channel configured to receive a cable. The at least one receptacle channel may be positioned between a first side ridge and a second side ridge, wherein the first and second side ridges extend vertically to different heights relative to the at least one receptacle channel. The cable protector may also include a cover panel mounted to the base portion and supported by the first and second side ridges, wherein the cover panel covers the at least one receptacle channel at a non-orthogonal angle with respect to the vertical direction.

The at least one receptacle channel may run longitudinally along the base portion. The base portion may include a plurality of receptacle channels configured to receive a plurality of cables, and the cover panel may be supported by at least one side ridge positioned between the plurality of receptacle channels.

The cable protector may have a base portion that has a first width and a cover panel that has a second width, with the second width being greater than the first width. The cover panel may comprise an outer end configured to rest on or adjacent to an adjacent floor panel while the cover panel is supported by the first and second side ridges. The cover panel may be mounted to the base portion by a rotatable hinge, wherein rotating the cover panel around the rotatable hinge may expose the at least one receptacle channel.

In some embodiments the base portion may be configured to attach to an adjacent floor panel. The base portion may also be configured to attach to an adjacent base portion of an adjacent second cable protector.

Another aspect of the disclosure relates to a flooring system for protecting cables between raised floor panels having different heights. The flooring system may comprise a base portion having a first end and a second end, and the base portion may have a first channel and a second channel positioned between the first and second ends. The first and second channels may be configured to receive cables. A first cover panel may be movably attached to the base portion, wherein the first cover panel may cover the first channel. The first cover panel may have a first upper surface that has a first slope. A second cover panel may be movably attached to the base portion, wherein the second cover panel may cover the second channel. The second cover panel may have a second upper surface that has a second slope. The first slope may be greater than the second slope.

In this flooring system, the base portion may comprise a plurality of modular cable channel members that are removably connected to each other. The first channel and second channel may each be in different cable channel members of the plurality of modular cable channel members. At least two of the plurality of modular cable channel members may be removably connected to a bridging connector member positioned between the at least two cable channel members. At least two of the plurality of modular cable channel members may be removably connected to each other at relatively staggered longitudinal positions.

The flooring system may also comprise a first floor panel and a second floor panel. The base portion may be positioned between the first and second floor panels such that the first cover panel may extend over the first floor panel and the second cover panel may extend over the second floor panel. One of the first and second floor panels may be taller than the other.

The first cover panel in the flooring system may contact the base portion on each side of the first channel, and the second cover panel may contact the base portion on each side of the second channel. The first and second cover panels may be rotatably attached to the base portion by respective first and second hinges. Here, the first cover panel may extend away from the first and second hinges or may extend away from the first hinge and toward the second hinge.

In yet another aspect, a method of protecting cables between adjacent raised surfaces is provided, which comprises positioning a base member on a ground surface between a first surface and a second surface, the first and second surfaces being raised relative to the ground surface, the base member having a first cable channel covered by a first cover plate and a second cable channel covered by a second cover plate. The method may further include moving the first cover plate to expose the first cable channel and positioning a first cable in the first cable channel, and moving the second cover plate to expose the second cable channel and positioning a second cable in the second cable channel. The first cover plate may then be moved to cover the first cable channel, to rest on the base member on each side of the first cable channel, and to be positioned at least partially above the first surface. The second cover panel may also be moved to cover the second cable channel, to rest on the base member on each side of the second cable channel, and to be positioned at least partially above the second surface.

The first surface may be on a first floor panel, and the method may further comprise attaching the base member to the first floor panel. The first and second cover plates may be moved into non-orthogonal positions relative to the ground surface when resting on the base member. In some embodiments, moving the first and second cover plates may comprise rotating the first and second cover plates relative to the base member. The base member may comprise a first base portion and a second base portion, the first and second base portions being separable from each other. Here, the method may further comprise separating the first and second base portions from each other and attaching the first and second base portions to opposite sides of a third base portion. The base member may comprise a first base portion having a first length and a second base portion having a second length, with the method further comprising attaching the first and second base portions to each other in a relatively staggered position.

The method may also further comprise laterally moving the base member between the first and second surfaces while covering the ground surface with the first and second cover plates.

Another aspect of the disclosure relates to a method of manufacturing a cable protector for positioning adjacent to a floor panel. The method may include providing a base portion and a cover panel, with the base portion having a hinge and a channel positioned between ridges and the cover panel being attachable to the hinge to cover the channel over the ridges. The method may also include determining a slope between the hinge and a top surface of an adjacent floor panel, forming the ridges to abut an underside of the cover panel while the cover panel is at the slope determined, attaching the cover panel to the hinge, and positioning the cover panel at the slope determined while abutting the ridges.

Yet another aspect of the disclosure is a method of protecting a ground surface using a cable protector positioned between ground protection panels. This method may comprise determining a distance between a first and a second ground protection panel and configuring the width of a cable protector to have a base portion that fits within the distance between the first and second ground protection panels and to have an upper surface that is greater than the distance between the first and second ground protection panels.

The above summary of the present invention is not intended to describe each embodiment or every implementation of the present invention. The Figures and the detailed description that follow more particularly exemplify a preferred embodiment.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
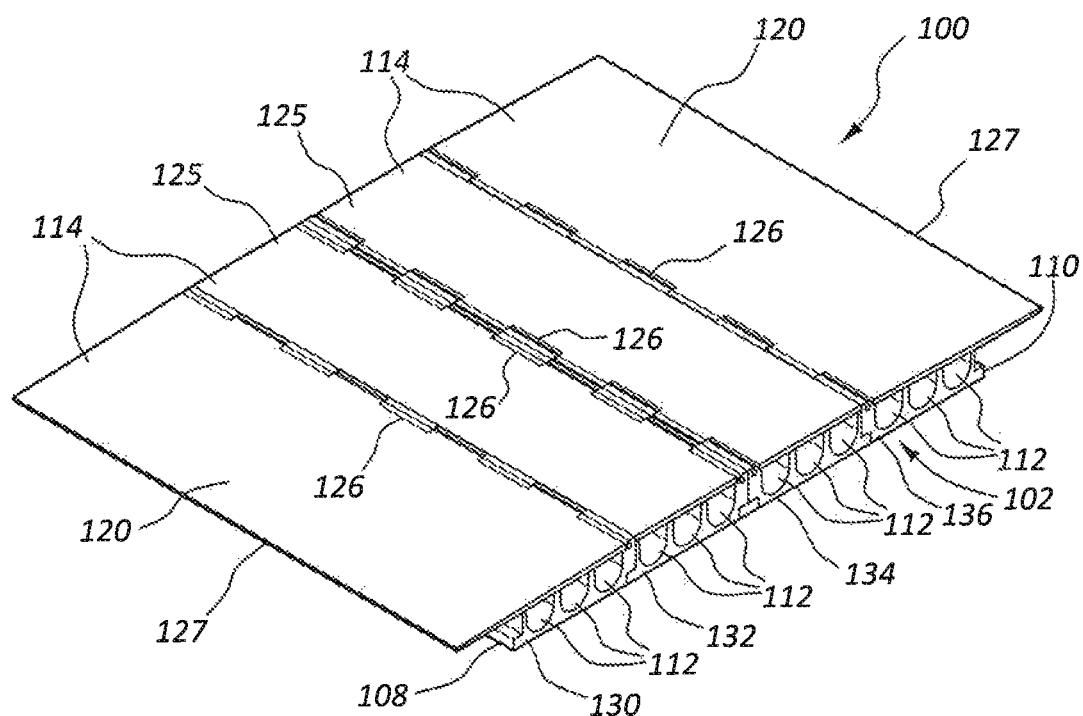
FIG. 1 is a top isometric view of a cable protector according to the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure generally relates to a cable protection system that may be used with ground protection panels to keep cables shielded from vehicle and foot traffic while also reducing hazards created by conventional cable protection measures. In an example embodiment, the cable protector may comprise a base portion having a receptacle channel configured to receive a cable. The channel may be positioned between two side ridges that extend vertically to different heights relative to the channel. A cover panel may be mounted to the base portion and may be supported by the side ridges at a non-orthogonal angle relative to the receptacle channel or the side ridges. The cable protector may be placed laterally adjacent to one or more ground protection floor panels so that cables can be housed in the channel and covered by the cover panel between the adjacent floor panels.

The cover panel may be sloped to transition between the cable protector and the surrounding ground panels (i.e., floor panels) to provide a generally continuous or gradually transitioning ground surface for vehicles and/or pedestrians that travel over the cable protector. With the cable protector placed between floor panels, the cables may be recessed below a top surface of the floor panels or below a top surface of the cable protector, thereby limiting the exposure of the cables to lateral forces (e.g., kicking or wheel damage) while they are within the cable protector. Also, the ridges on the sides of the cable receptacle channel may provide undergirding support for the cover panel to ensure that the cover panel can support heavy loads without crushing cables held beneath.

In some embodiments, the base portion of the cable protector may be attachable to the adjacent floor panels to limit lateral movement of the floor panels away from the cable protector due to travel on top of the ground surface. Thus, sides of the cable protector may be configured to engage with and/or connect to engagement features (e.g., attachment orifices/hooks or cams and cam-receiving features) on adjacent floor panels. Cover panels may extend over the transition area between the cable protector and the floor panels to protect the transition area and connection features from exposure and potential damage to the ground surface beneath.

A cover panel may be mounted or attached to the base portion by a rotatable hinge. This may allow the cover panel to be rotated between a position exposing the cable channel in the cable protector for easy insertion of the cable into the cable channel and a position covering the cable channel and resting on at least two points on the top of the base portion. The exposing position may be referred to as an "open" position, and the covering position may be referred to as a "closed" position. In the closed position, the cover panel may rest on the base portion at an angle that gradually transitions between the hinge connection of the cover panel and the surface of the adjacent floor panel.

Some embodiments may have a modular design, wherein a plurality of separate cable protectors may be interconnected to form a modular cable protector assembly that is positioned between adjacent floor panels. Each module may comprise its own base portion with at least one cable channel and cover panel that covers that cable channel. At least one of the sides of each module may comprise a connection feature, such as a plurality of male and/or female members (which may be collectively referred to as connection members) that are configured to interlock with corresponding connection members of an adjacent base portion. In some cases, the connection features of two or more adjacent base portions may be connected to an intermediate module that may receive the connection members of the two base portions that would not be able to connect to each other. For example, the intermediate module may comprise female members that are configured to receive male members from two adjacent base portions. Using the modular design, the width and capacity of the cable protector assembly may be customized and adjusted based on the needs of the user.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

Figure 2:
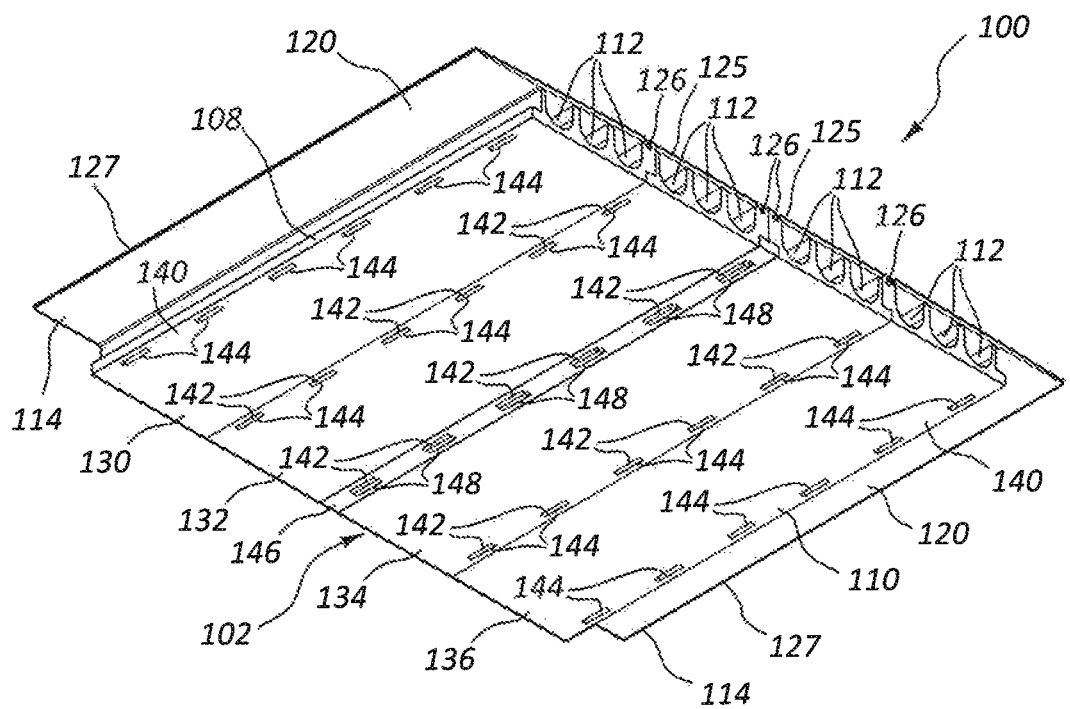
FIG. 2 is a bottom isometric view of the cable protector of FIG. 1.
Figure 3:
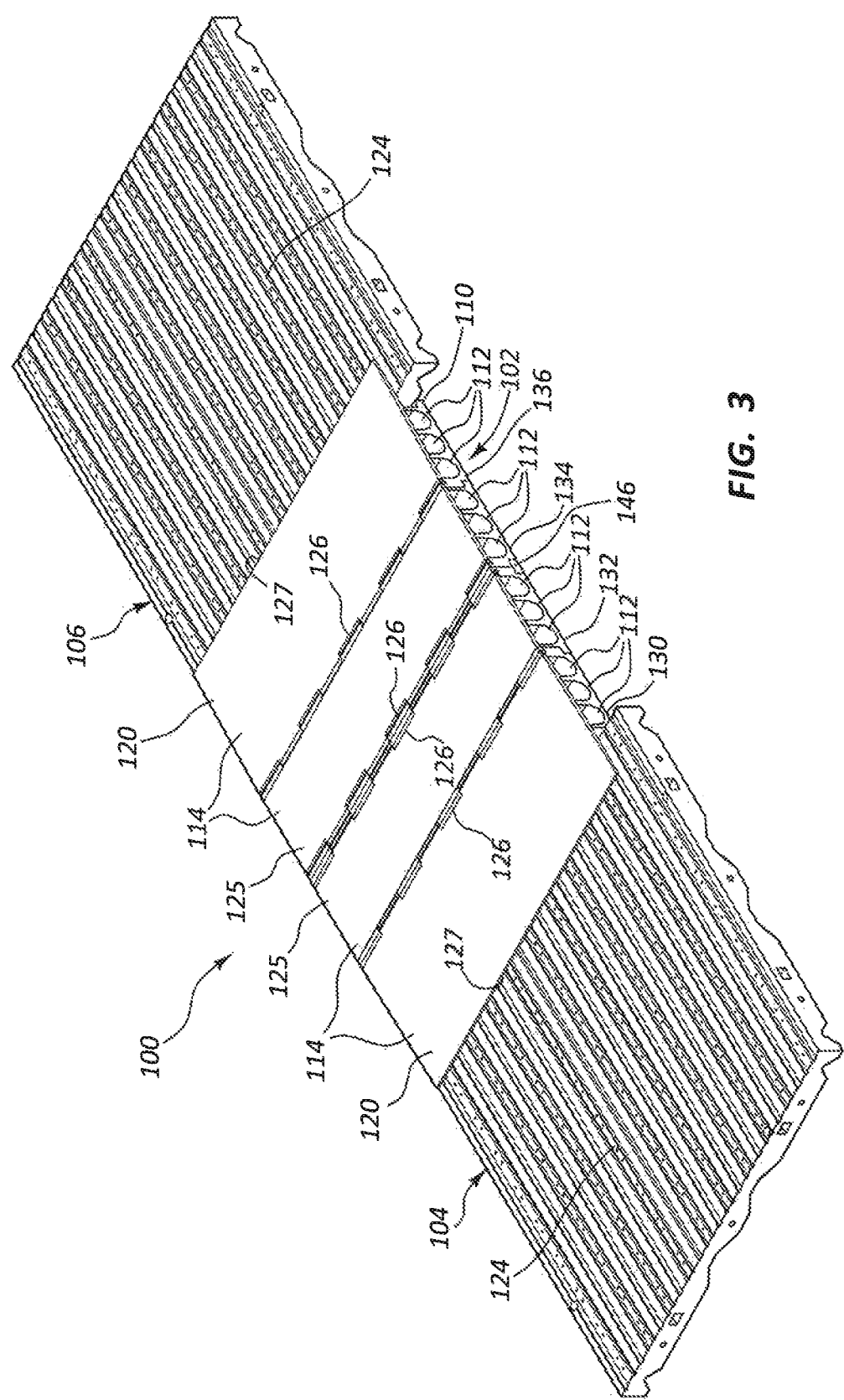
FIG. 3 is a top isometric view of the cable protector of FIG. 1 arranged between two adjacent floor panels.
Figure 4:
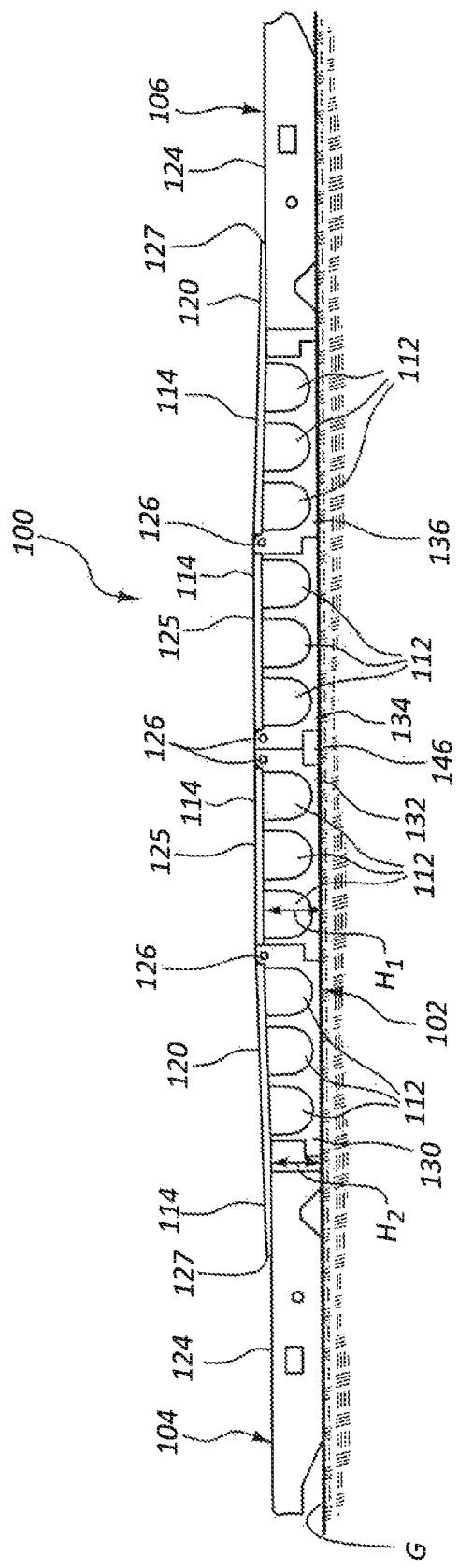
FIG. 4 is an end view of the cable protector and floor panels of FIG. 3.

Referring now to the figures in detail, FIGS. 1-2 show a cable protector 100 according to an embodiment of the present disclosure. FIGS. 3-4 show the cable protector 100 positioned between two adjacent floor panels 104, 106.

Figure 5:
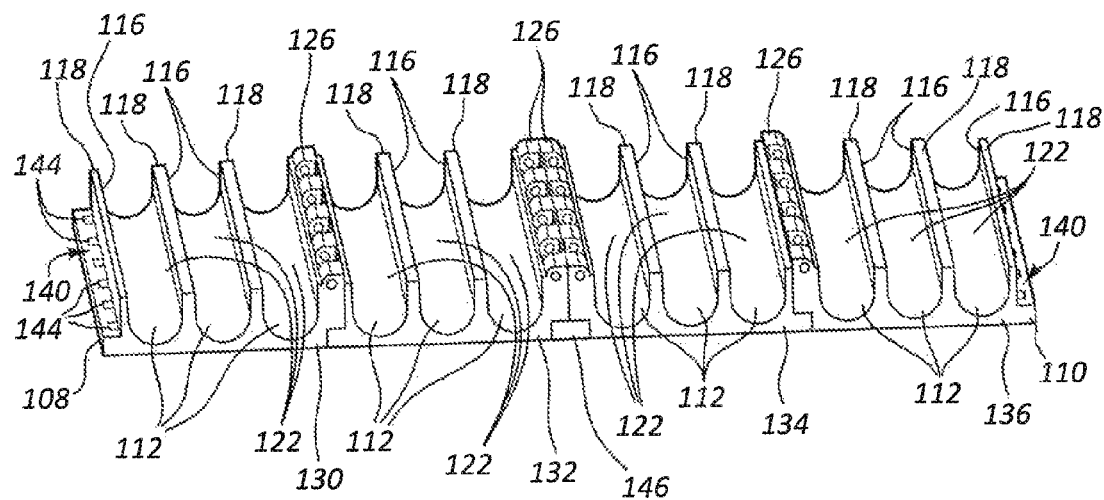
FIG. 5 is an isometric view of a base portion of a cable protector.

The cable protector 100 may comprise a base portion 102. FIG. 5 shows the base portion 102 isolated from other elements of the cable protector 100. The base portion 102 may include a first side 108 and a second side 110 configured to be positioned between two adjacent floor panels 104, 106. The base portion 102 may include a plurality of longitudinally- or axially-extending receptacle channels 112 which may be used to hold cables, hoses, ropes, pipes, or other elongated equipment or devices in the base portion 102. In FIGS. 1-5, the base portion 102 is shown with twelve channels 112, but other numbers of channels are contemplated. For example, a base portion 102 may comprise more or fewer channels, such as the base portion 302 that has ten channels that is shown in FIGS. 9-17.

The receptacle channels 112 may be positioned between the first and second sides 108, 110. The receptacle channels 112 may alternatively be referred to as cable paths, slots, and/or grooves. The receptacle channels 112 may be sized so that the devices being stored in each of the channels 112 may fit in the channels 112 without protruding above the channels 112 (e.g., into contact with cover panels 114 that extend over the channels 112). The channels 112 may be open at their terminal ends so that a continuous cable channel can be formed by abutting or connecting multiple longitudinally-adjacent base portions 102. The channels 112 may have a scooped profile (see FIG. 4) wherein the bottom surfaces 122 of the channels 112 are semi-cylindrical or U-shaped. In some arrangements, the bottom surfaces 122 (see FIG. 5) may be flat (e.g., a rectangular channel) or angled (e.g., a V-channel). The profiles and sizes of the channels 112 may also differ from channel to channel. For example, some channels 112 may be wider or may have a different profile shape when compared to other channels 112.

Ridges 116 may extend vertically upward on each side of the channels 112 to form sidewalls of the channels 112 and top surfaces 118 of the base portion 102. See FIG. 5. The top surfaces 118 may be configured to contact the cover panels 114, as shown in the side view of FIG. 4. Thus, each of the ridges 116 may be used as a vertical support for a cover panel 114 when the cover panel 114 is in a closed position. The ridges 116 may each have a different thickness or may have uniform thickness. For example, some ridges 116 that are not immediately adjacent to attachment points between the cover panels 114 and the base portion 102 may be thicker to increase their rigidity and to limit buckling or bending.

The ridges 116 may have different heights. As shown in FIG. 4, one of the ridges 116 toward the center of the base portion 102 may have a height $H_1$ that is greater than a height $H_2$ of a ridge toward one of the sides 108, 110 of the base portion 102. In some arrangements the heights $H_1$, $H_2$ of the ridges 116 may be measured from the ground surface G, from the underside of the base portion 102, or from one or more bottom surfaces 122 of the channels 112. End-positioned cover panels 120 that are proximate to and/or extend over the sides 108, 110 of the base portion 102 may be angled relative to the ground surface G or the bottom of the channels 112 or the bottom of the base portion 102 when in a closed position while resting on ridges 116 having different heights. In some embodiments, the end-positioned/peripheral cover panels 120 may be defined as being angled or non-orthogonal relative to the ridges 116, bottom surfaces 122 of the channels 112, or top surfaces 124 of adjacent floor panels 104, 106. Other cover panels 114, such as the central cover panels 125, may have a flat upper surface that is parallel to the ground surface G, the underside of the floor panels 104, 106, and/or the underside of the base portion 102.

The angles of the angled cover panels 114 (e.g., end-positioned cover panels 120) may be configured to provide a generally continuous ramp transition between the top surfaces 124 of the adjacent floor panels 104, 106 and the top surfaces of the central cover panels 125 of the cable protector 100. The external edges 127 of the end-positioned cover panels 120 may be configured to touch the top surfaces 124 of the adjacent floor panels 104, 106. In some embodiments, the edges 127 may have reduced thicknesses relative to the rest of the end-positioned cover panels 120 to further facilitate the gradual transition between the floor panels 104, 106 and the cover panels 114. In some embodiments, each of the ridges 116 between the hinges 126 of the cover panels 114 may support the cover panels 114, including ridges 116 positioned between different adjacent channels 112 of the base portion 102. Thus, a cover panel 114 may be supported by a plurality of ridges 116.

The cover panels 114 may be attached or connected to the base portion 102 along longitudinal hinges 126 that may be formed by the cover panels 114 and the base portion 102. The hinges 126 may allow the cover panels 114 to rotate relative to the base portion 102 while remaining connected to the base portion 102. See, e.g., FIG. 14. Thus, the hinges 126 may help the cover panels 114 to stay stationary relative to the base portion 102 when in a closed position, but may be pivoted in order to access the channels 112 beneath the cover panels 114. The cover panels 114 may therefore be said to be rotatably attached or may be capable of rotation relative to the base portion 102 while being connected thereto. The base portion 102 may comprise a plurality of hinges 126 that allow a plurality of cover panels 114 to be connected to the base portion 102. For example, in a modular base portion embodiment, each modular base portion (e.g., modular base portions 130, 132, 134, 136, described below) may comprise a separate hinge 126 and cover panel 114 to cover its respective channels 112. The embodiments shown in the figures show a hinge 126 that does not protrude above the top surfaces of the cover panels 114 when the cover panels 114 are in a closed position. This may be beneficial in providing a smooth, continuous upper surface of the cable protector 100, particularly at the hinges 126 between the central cover panels 125 and the end-positioned cover panels 120.

Another aspect of the disclosure relates to a modular cable protector system. The base portion 102 may be a single, integral unit, but in some cases the cable protector 100 may comprise a plurality of modular base portions 130, 132, 134, 136 that are connectable to each other to form the base portion 102. These modular base portions 130, 132, 134, 136 may alternatively be referred to as modular cable channel members.

FIGS. 1-5 show four modular base portions 130, 132, 134, 136 connected to each other, but in other embodiments, more or fewer modular base portions 130, 132, 134, 136 may be provided in the cable protector 100. For instance, only modular base portions 130, 132, and 136 may be implemented, or modular base portions 130, 136 may be implemented with a modular base portion that is modular base portions 132, 134 integrally combined. In some cases, each of the modular base portions 130, 132, 134, 136 (and their cover panels 114) may be referred to as "cable protectors" that attach to each other. Using a smaller number of modular base portions 130, 132, 134, 136 may narrow the distance between the sides 108, 110 of the base portion 102 and reduce the number of channels 112 in the base portion 102. In the embodiment of FIGS. 1-5, two end base portions 130, 136 and two central base portions 132, 134 are used.

The end base portions 130, 136 have ridges 116 that support cover panels 120 that are angled, and the central base portions 132, 134 have ridges 116 that support cover panels 125 that are horizontal. Depending on the installation, the base portion 102 may be customized by adding or removing modular base portions 130, 132, 134, 136 so that a sloped cover panel may be provided that overlaps and extends over and into contact with a top surface 124 of an adjacent floor panel (e.g., 104, 106) on each side 108, 110 of the base portion 102. The slopes of cover panels 114 may beneficially comply with regulations under the Americans with Disabilities Act (ADA) and/or other locally-enforced rules and regulations.

Figure 6:
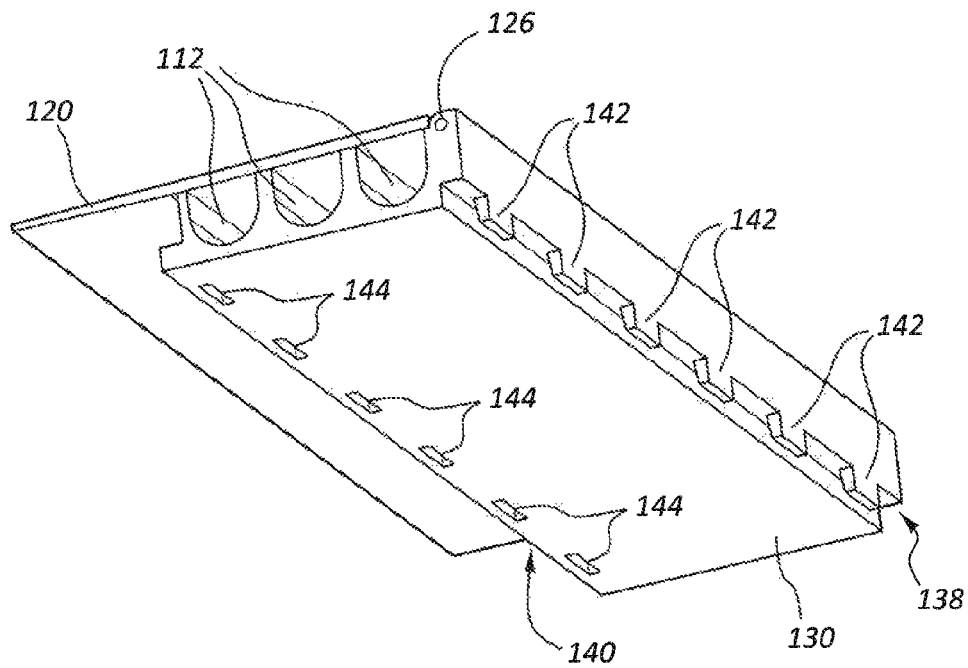
FIG. 6 is an isometric view of a modular base portion of a cable protector.
Figure 7:
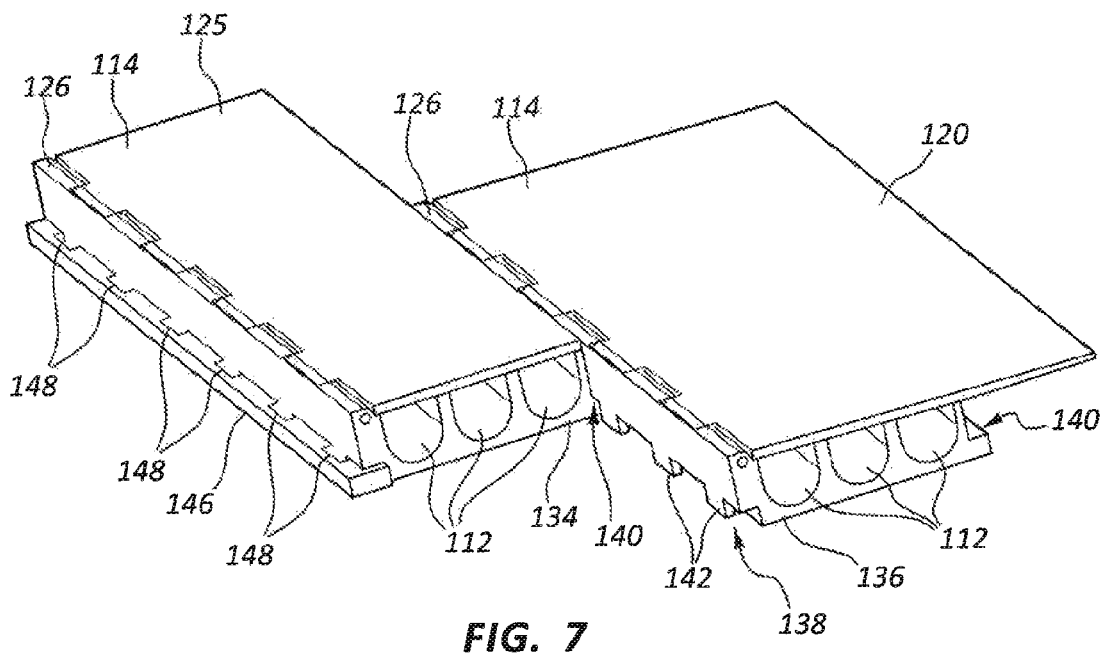
FIG. 7 is an isometric view of multiple modular base portions of a cable protector.

Each of the modular base portions 130, 132, 134, 136 may have at least one male connector portion 138 or female connector portion 140. See FIGS. 2 and 5-7. FIG. 6 shows an example modular base portion 130 that is isolated from the other three modular base portions 132, 134, 136. FIG. 7 shows an example embodiment wherein two modular base portions 134, 136 are shown separated from the other modular base portions 130, 132. A male connector portion 138 may be at least partially inserted into and received by a female connector portion 140 along at least part of the length of the modular base portion 130, 132, 134, 136. For example, the male connector portions 138 may comprise a plurality of protrusions 142 that fit into and interlock with a plurality of apertures 144 in the female connector portions 140. In some embodiments, the protrusions 142 are press-fit or friction-fit into the plurality of apertures 144, and in some embodiments the protrusions 142 may mechanically interlock with the apertures 144.

Individual protrusions 142 and individual apertures 144 of the respective male and female connector portions 138, 140 may be spaced apart in a manner that allows two consecutive protrusions 142 to connect to any two consecutive apertures 144. Thus, for example, all six protrusions 142 shown in FIG. 6 may fit into all six apertures 144 that would be on an adjacent female connector portion 140. In another example, two of the protrusions 142 may be inserted into two adjacent apertures 144 with the remaining four apertures 144 and the remaining four protrusions 142 not being connected to each other. FIG. 7 shows an embodiment where two adjacent modular base portions 134, 136 are staggered using this technique in a brickwork-like pattern with three of the protrusions 142 being received by three apertures 144.

Additional modular base portions may be attached to those base portions 134, 136 to form an interlocking network of modular base portions that is interconnected laterally (i.e., in a direction extending across the space between the adjacent floor panels 104, 106) and longitudinally (i.e., in a longitudinal direction parallel to the channels 112).

Figure 8:
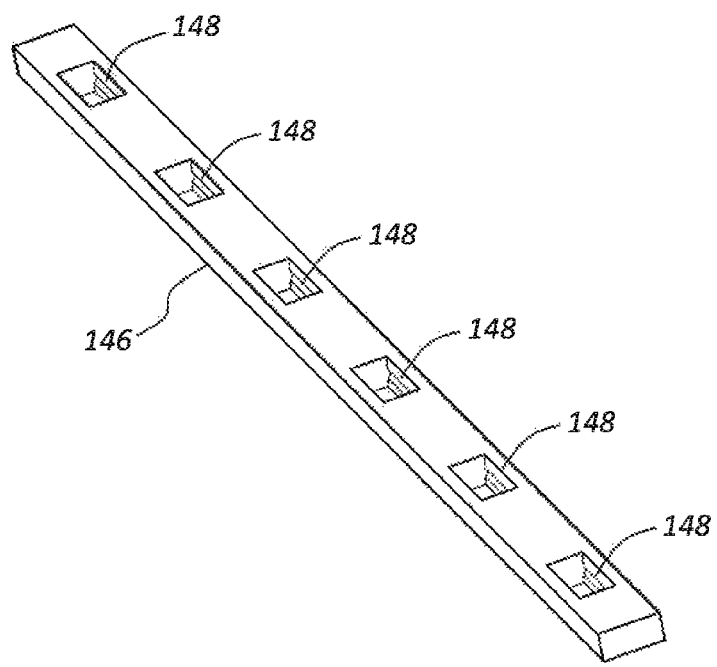
FIG. 8 is an isometric view of a bridge connector strip of a cable protector.
Figure 9:
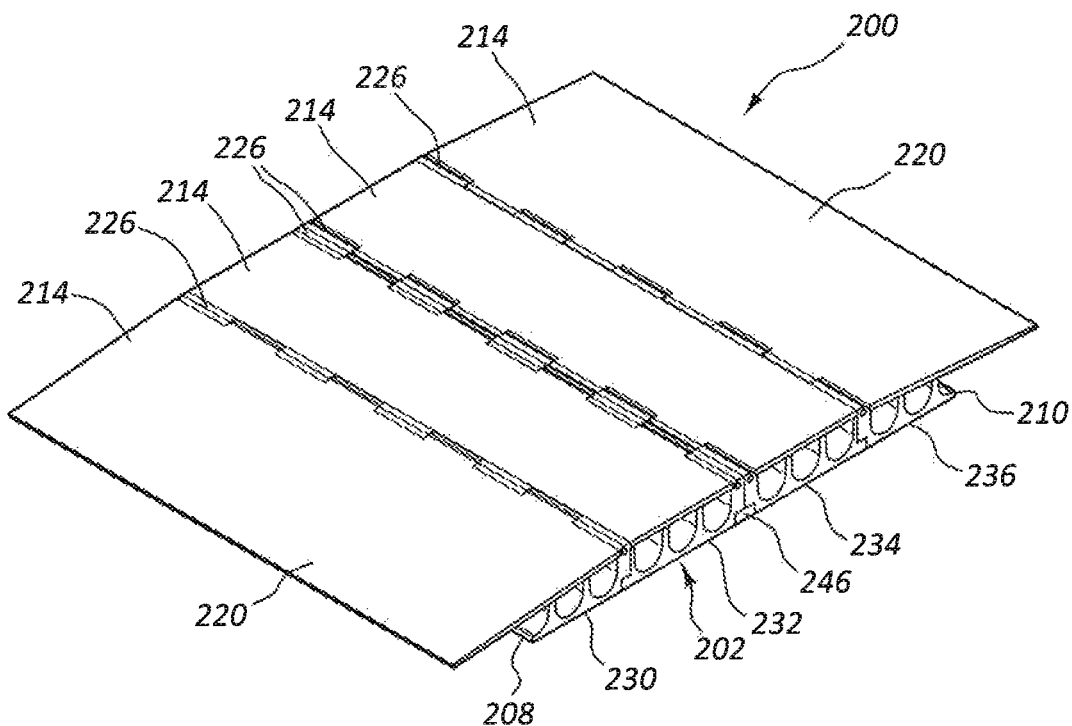
FIG. 9 is a top isometric view of another embodiment of a cable protector of the present disclosure.
Figure 10:
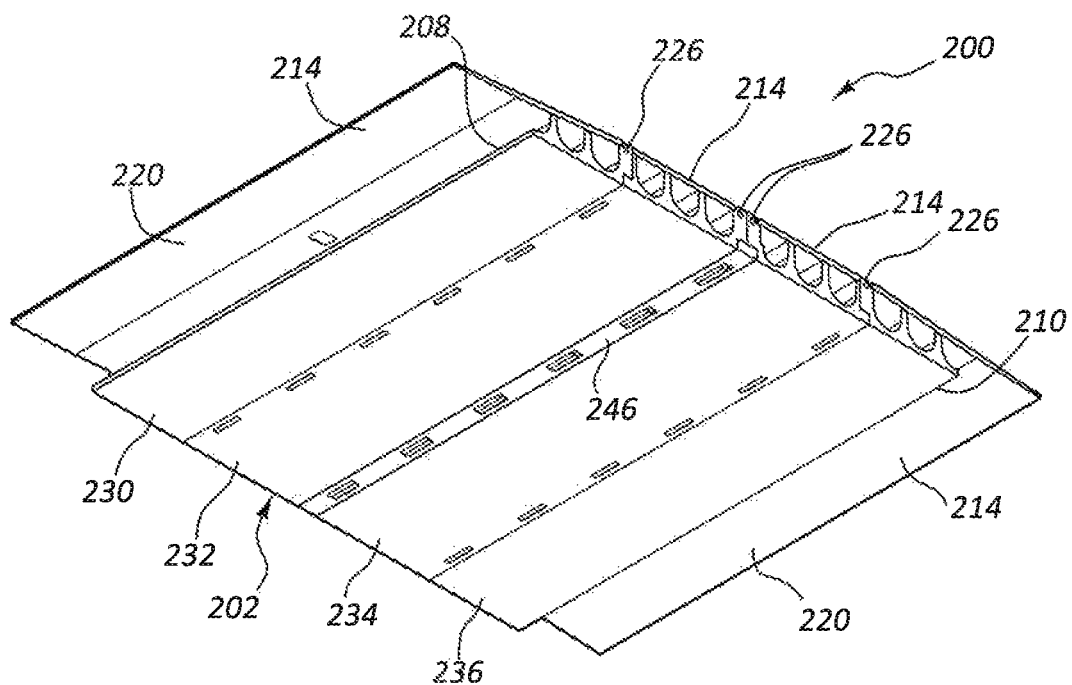
FIG. 10 is a bottom isometric view of the cable protector of FIG. 9.
Figure 11:
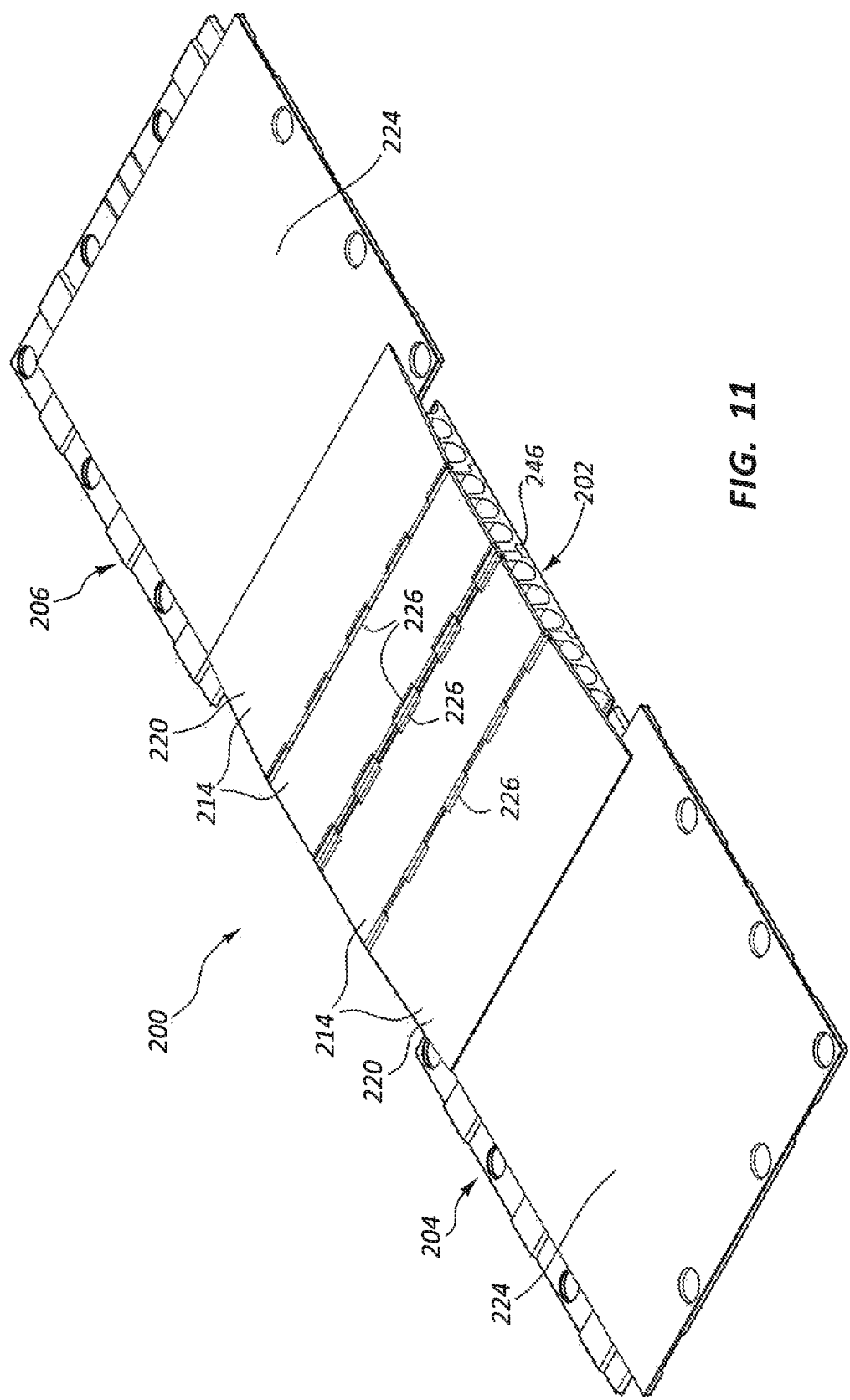
FIG. 11 is a top isometric view of the cable protector of FIG. 9 positioned between adjacent floor panels.
Figure 12:
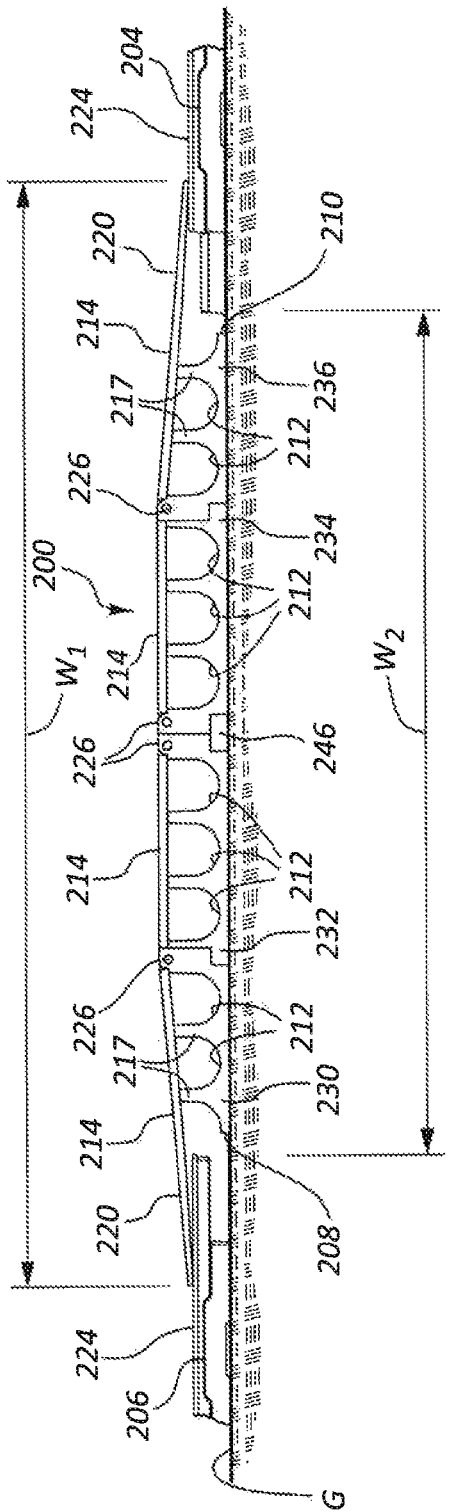
FIG. 12 is an end view of the cable protector and floor panels of FIG. 11.

Two male connector portions 138 on two of the modular base portions 130, 132, 134, 136 may be connected to a bridge connector strip 146. See FIG. 8; see also FIGS. 2, 4, and 7. The bridge connector strip 146 may comprise a plurality of apertures 148 configured to receive protrusions 142 of male connector portions 138. Each of the apertures 148 may receive up to two protrusions 142, including, for example, one from each of two different male connector portions 138, as shown in FIG. 2. The bridge connector strip 146 may therefore be used to connect two of the same connector portions (e.g., 138) of the modular base portions 130, 132, 134, 136. In another embodiment, the bridge connector strip may comprise a plurality of protrusions similar to protrusions 142 to connect two adjacent female connector portions 140.

In some embodiments, the bridge connector strip 146 may be advantageous for orienting the cover panels 114 on the modular base portions 130, 132, 134, 136. The hinges 126 on the modular base portions 130, 132, 134, 136 may all be positioned above only one type of connector portion 138, 140. In FIGS. 1-7, the hinges 126 are all positioned above male connector portions 138 and are opposite the female connector portions 140 on their respective modular base portions 130, 132, 134, 136. This means that if all of the modular base portions 130, 132, 134, 136 were connected male-to-female, all of the hinges would have to open in the same direction (e.g., clockwise). Using the bridge connector strip 146, however, the male connector portions 138 of two of the modular base portions (e.g., 132, 134 in FIGS. 1-2) may be joined so that, as seen in FIG. 1 (and by comparing similar structures in FIG. 14), hinges 126 on modular base portions 130, 132 on one side (e.g., 108) of the bridge connector strip 146 may open in one direction (e.g., clockwise) and hinges 126 on the modular base portions 134, 136 on the other side (e.g., 110) of the bridge connector strip 146 may open in the opposite direction (e.g., counter-clockwise). In some cases, this may mean that a cover panel 114 may be configured to extend away from its own hinge 126 and away from another hinge on the cable protector 100 (e.g., one of the end-positioned cover panels 120) or that the cover panel 114 may be configured to extend away from its own hinge 126 and toward another hinge 126 on the cable protector 100 (e.g., one of the central cover panels 125).

Besides changing the direction of rotation of the cover panels 114, the orientation of the cover panels 114 may affect the slope of the cover panels 114, particularly in the case of the end-positioned cover panels 120 that are configured to extend to a width greater than the width of their respective base portions 130, 136. Using the bridge connector strip 146 may ensure that the end-positioned cover panels 120 extend away from the center of the base portion 102 and over the top of the adjacent floor panels 104, 106 rather than toward the center of the base portion 102 and over the top of the central cover panels 125. Thus, the end-positioned cover panels 120 may properly slope toward the top surfaces 124 of the adjacent floor panels 104, 106.

The cable protector 100 may beneficially bridge between multiple adjacent floor panels 104, 106 and may comprise materials compatible with protecting the cables (or other devices in the channels 112), adjacent floor panels 104, 106, people and vehicles in the area, and the ground surface G. For instance, in some embodiments the ground surface G may be protected and preserved by the cable protector 100 being constructed at least in part using transparent or translucent materials (e.g., plastics) that allow sunlight to penetrate the cable protector 100 to reach plants (e.g., grass or turf) underneath the cable protector 100 in a manner similar to transparent/translucent adjacent floor panels 104, 106. Other embodiments may comprise opaque materials, such as, for example, panels used on indoor turf fields. The base portion 102 and cover panels 114 may generally be constructed of a rigid plastic and/or metal material. In some embodiments, the material used may be configured to be cut or otherwise shaped to have a desired profile. See FIG. 13 and its description below. The upper surfaces of the cover panels 114 that are exposed to traffic may comprise informational indicators or textures to improve safety and/or traction of entities traveling over the cable protector 100.

Embodiments of the cable protectors disclosed herein may be customized for different types of installations. FIGS. 9-12 illustrate an example cable protector 200 having a base portion 202 positioned between two adjacent floor panels 204, 206. The base portion 202 has a plurality of cover panels 214. Here, the adjacent floor panels 204, 206 have a lower height than the adjacent floor panels 104, 106 of FIGS. 1-4, and the base portion 202 is not as wide as base portion 102. As a result, the end-positioned cover panels 220 are also more steeply sloped on each side 208, 210 of the base portion 202 than end-positioned cover panels 120. This may allow the end-positioned cover panels 220 to extend from their hinges 226 into contact with the top surfaces 224 of the adjacent floor panels 204, 206 which are lower than the top surfaces 124 of the previously described adjacent floor panels 104, 106. Ridges 217 between channels 212 in the base portion 202 may also be modified as compared to ridges 116 so that the top surfaces of the ridges 217 support the end-positioned cover panels 220 at the steeper slopes.

Additionally, there are only ten channels 212 in the base portion 202. The six central channels 212 are the same as in cable protector 100, but the outer four channels 212 are not as deep as the outer six channels 112 of cable protector 100. Accordingly, the outer four channels 212 may be configured to hold smaller or fewer cables or other devices, and the base portion 202 may fit between adjacent floor panels 204, 206 that are positioned more closely together.

The widths of the end-positioned cover panels 220 may be large enough to extend over the top surfaces 224 of the adjacent floor panels 204, 206. By extending over those top surfaces 224 there is a smoother, more continuous and gradual transition between the cover panels 220 and the top surfaces 224. The overhang of the end-positioned cover panels 220 may also allow the cable protector 200 to move laterally between the adjacent floor panels 204, 206 without exposing the ground surface G. For example, in FIG. 12 the base portion 202 is shown between and not contacting the adjacent floor panels 204, 206, but if the base portion 202 is moved laterally (e.g., a few inches) toward adjacent floor panel 204, the end-positioned cover panel 220 on the side 210 of the base portion 202 that is opposite adjacent floor panel 204 will still contact the top surface 224 of adjacent floor panel 206 and provide a smooth transition surface between the adjacent floor panel 206 and the cable protector 200. Said another way, the overall width $W_1$ of the upper surface of the cable protector 200 may be greater than the width $W_2$ of the space between the adjacent floor panels 204, 206. Movement of the floor panels 204, 206 may be common when vehicles or large groups of people (e.g., people dancing or jumping) are on the floor panels 204, 206. The ground surface G may still be protected if one or more of the adjacent floor panels 204, 206 moves laterally relative to the cable protector 200, within a predetermined distance (e.g., as long as $W_2$ is less than $W_1$). These features of ground protection may also be implemented in cable protector 100.

Cable protector 200 may also have a modular base design. Modular base portions 230, 232, 234, 236 may be interconnected to form the base portion 202. In some embodiments, a bridge connector strip 246 may be used. The central modular base portions 232, 234 may be the same as modular base portions 132, 134, and the outer modular base portions 230, 236 may differ from modular base portions 130, 136. The outer modular base portions 230, 236 may be manufactured to have two channels 212 instead of three, and may have lower ridges 216 to support a steeper slope for the end-positioned cover panels 220.

In another aspect of the disclosure, a method of manufacturing the base portion of the cable protector may comprise determining the slope that the end-positioned cover panels 220 will need to have to extend from a hinge 226 to a top surface 224 of an adjacent floor panel 204, 206, providing a modular base portion (e.g., modular base portion 232) having a plurality of ridges 216 for supporting a cover panel, and forming the ridges 216 to abut the underside of at least one of the end-positioned cover panels 220 while the end-positioned cover panels 220 are at the determined slope or while the end-positioned cover panel 220 extends into contact with the top surface 224 and the hinge 226. The "forming" step may comprise cutting or grinding off the ridges 216 to be shortened to desired supporting heights. In another embodiment, the modular base portion may be molded or otherwise originally shaped or fashioned to have ridges 216 that support the determined slope.

In some embodiments, a method may comprise determining a distance between adjacent floor panels 204, 206 wherein a cable protector 200 is to be positioned, and configuring the width of the cable protector 200 to have a base portion 202 that fits within that distance and to have an upper surface that is greater than that distance. The "configuring" step may comprise forming or fashioning the width of the base portion 202 by adding or removing modular base portions 230, 232, 234, 236 or by cutting off (or originally forming) the base portion 202 to be narrower. In this method, the distance between the adjacent floor panels 204, 206 may be determined by counting the collective number of the cables to be protected (or by measuring their widths) and then configuring the base portion 202 to be capable of holding that number (or those widths) of cables by ensuring that the base portion 202 has a sufficient number of channels 212. Excess channels 212 may be cut off of (or not originally formed into) some of the modular base portions 230, 232, 234, 236 to reduce their width.

Figure 13:
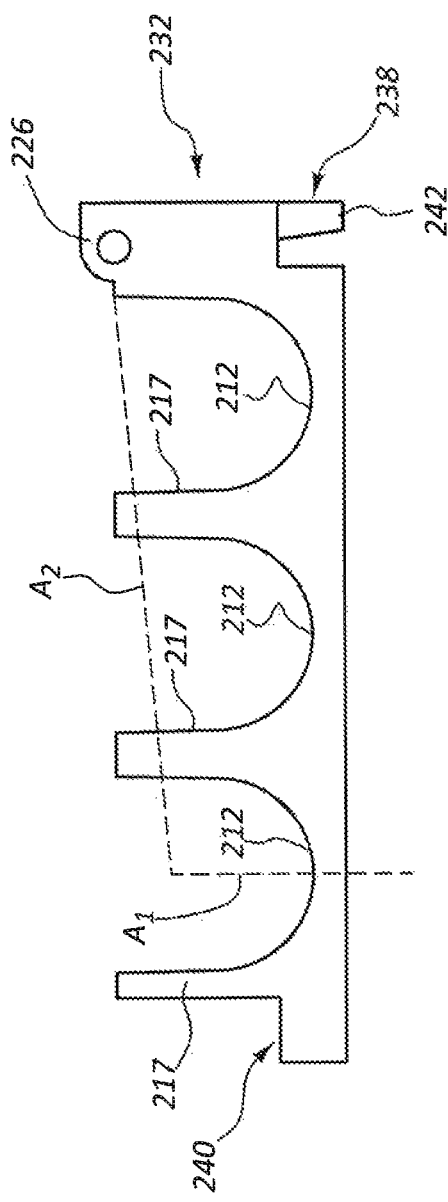
FIG. 13 is an end view of a modular base portion of a cable protector.

The outer modular base portions 230, 236 in FIGS. 9-12 show an example implementation of these methods. The outer modular base portions 230, 236 are modified central modular base portions 232, 234 that have been cut off by removing one outermost channel 212 and by reducing the height of the ridges 217 to support an end-positioned cover panel 220 between the hinge 226 and the top surface 224 of an adjacent floor panel 204. The dashed lines $A_1$, $A_2$ in the end view of FIG. 13 illustrate where a central modular base portion 232 may be modified to obtain an outer modular base portion 230. Line $A_2$ may have a slope about equal to the slope that the cover panel 220 should have when extending between the hinge 226 and the top surface 224 of an adjacent floor panel 204. Thus, when the cover panel 220 rests on the cut-off slope, it will provide a smooth transition that is supported by the ridges 217.

FIG. 13 also illustrates a side view of a male connector portion 238 (and a protrusion 242) and female connector portion 240 that are comparable to male and female connector portions 138, 140. By modifying the modular base portion 232, the female connector portion 240 and one of the ridges 217 may be removed. By modifying modular base portions 232, each installation of the cable protector 200 may have individually customized ramp slopes, heights, and widths.

FIGS. 14-17 illustrate yet another embodiment of a cable protector 300 of the present disclosure. Here, the cover panels 314 are shown rotated around their hinges 326 into an open position that exposes the cable channels 312 in the base portion 302. The first and second sides 308, 310 of this base portion 302 may be connectable or attachable to adjacent floor panels 304, 306. Thus, the base portion 302 may interlock with adjacent floor panels 304, 306 to affix or secure the sides 308, 310 in a predetermined position relative to the adjacent floor panels 304, 306.

In one example embodiment, the adjacent floor panels 304, 306 are designed to interlock with other floor panels to form a continuous flooring system with cable storage and protection features. The base portion 302 of the cable protector 300 may therefore beneficially be configured to connect to and interlock or link with the adjacent floor panels 304, 306 using connectors and interfaces that are compatible with the adjacent floor panels 304, 306. For example, in some cases the adjacent floor panels 304, 306 use cam systems or mechanically interlocking parts to connect to each other, so the cable protector 300 may have a panel interface portion that compatibly connects to those cam systems or mechanically interlocking parts.

FIGS. 14-17 show a panel interface portion 350, 351 on each of the sides 308, 310 of the base portion 302 that allow the base portion 302 to connect and interlock with adjacent floor panels 304, 306 in a manner that matches or imitates the connection and interface that would be used between two floor panels. Using the panel interface portions 350, 351, the cable protector 300 may be more securely held in place relative to the adjacent floor panels 304, 306 to prevent exposure of the ground surface G or misalignment of the cable protector 300 due to relative movement between the adjacent floor panels 304, 306 and the cable protector 300.

In some embodiments, the panel interface portions 350, 351 may comprise a plurality of cam openings 352. The cam openings 352 may be configured to receive cams and/or protrusions on panel interface portions 354, 356 of the adjacent floor panels 304, 306. In some arrangements, a first type of panel interface portion 350 may be on one side 308 of the base portion 302 and a second type of panel interface portion 351 may be on the other side 310 of the base portion 302. The first type of panel interface portion 350 may be configured to mate with the second type of panel interface portion 354 on an adjacent floor panel 304. Likewise, the second type of panel interface portion 351 may be configured to mate with the first type of panel interface portion 356 on another adjacent floor panel 306. Thus, the cable protector 300 may be constructed to bridge between and connect two panel interface portions 354, 356 that would be connectable to each other. In some arrangements, the first and second types of panel interface portions 350, 351 may be referred to as compatible female and male components.

The longitudinal length of the base portions of a cable protector (e.g., in the direction parallel to the channels) may not necessarily correspond with the longitudinal length of an adjacent floor panel (as shown in FIG. 3). This is, in part, due to the universal nature of the design of the embodiments shown in FIGS. 1-13, since they are not hard-connected and attached to the adjacent floor panels and, instead, only contact the adjacent floor panels. The embodiment of FIGS. 14-17 may also have a non-corresponding longitudinal length. In these figures the base portions 330, 332, 334, 336 have a longitudinal length that matches the length of an adjacent floor panel 304, 306, less the length of the interface portion 356, as shown, for example, in FIGS. 15 and 17. When multiple panels 304, 306 and multiple cable protectors 300 are arranged end-to-end, there may be a 1:1 ratio of cable protectors 300 to floor panels 304, 306. The channels 312 may also be uninterrupted and may be covered by cover panels 314 along their lengths.

Additionally, a plurality of cable protectors 300 arranged end-to-end may have multiple panel interface portions 350, 351 that collectively match the spacing between multiple panel interface portions 354, 356 of the adjacent floor panels 304, 306. This may allow long end-to-end arrangements of cable protectors 300 to connect continuously to edges of systems of multiple panel interface portions 354, 356 of floor panels 304, 306.

Figure 14:
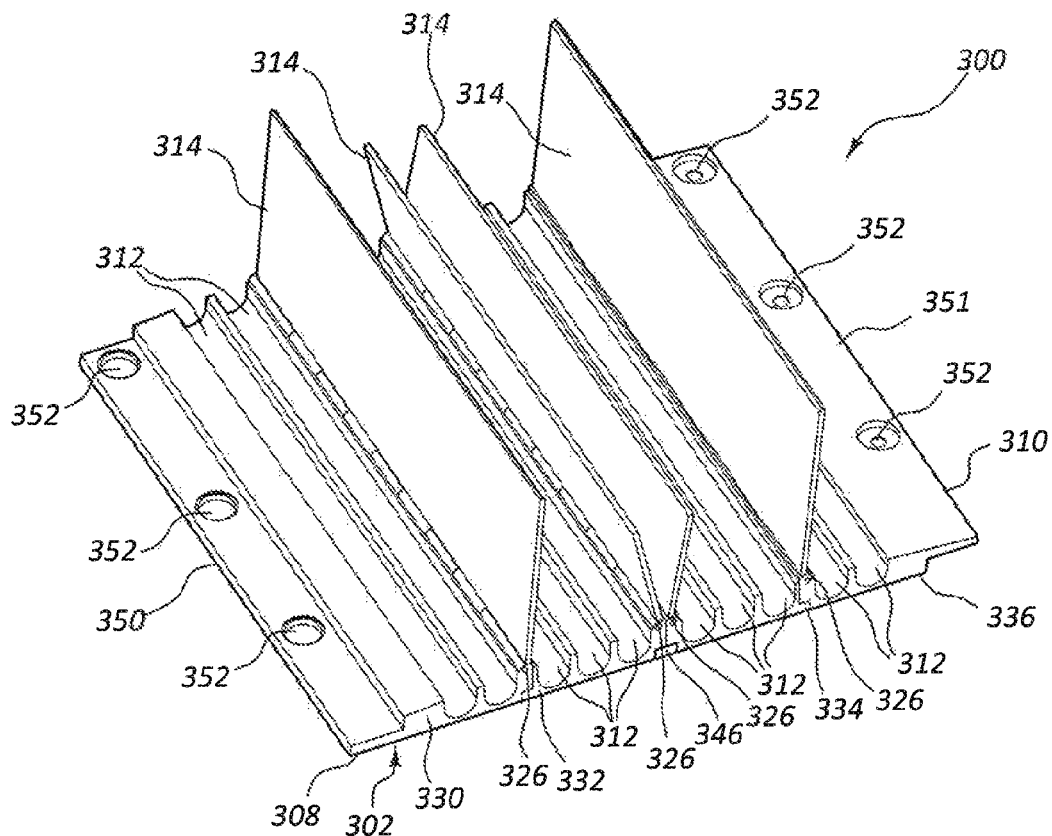
FIG. 14 is a top isometric view of a cable protector according to another embodiment of the present disclosure.
Figure 15:
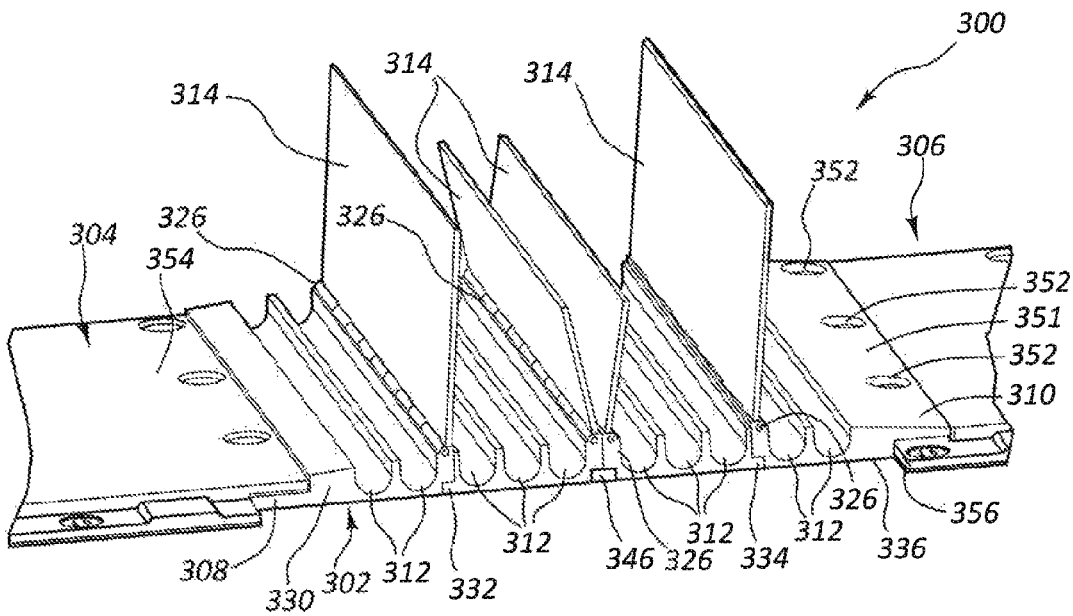
FIG. 15 is a top isometric view of the cable protector of FIG. 14 connected to adjacent floor panels.
Figure 16:
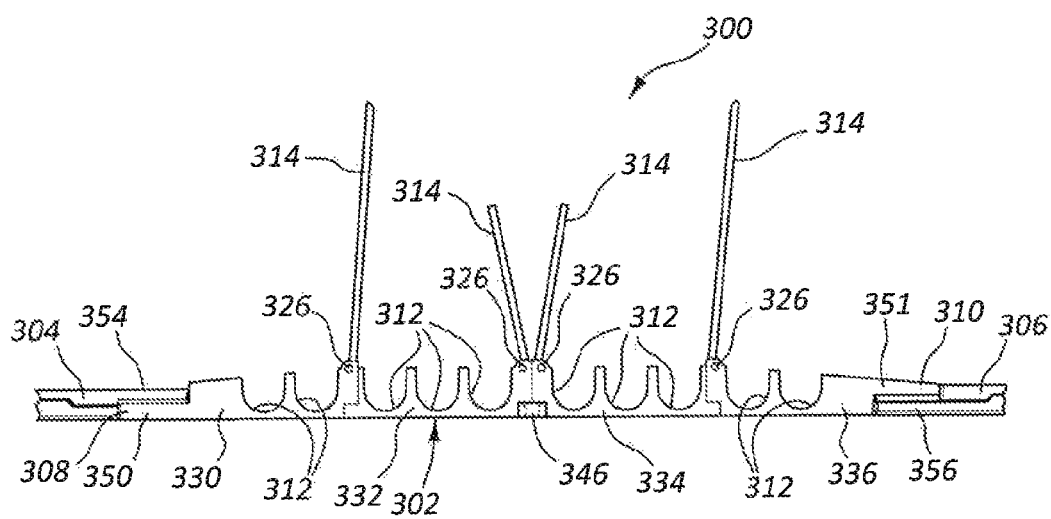
FIG. 16 is an end view of the cable protector and floor panels of FIG. 15.
Figure 17:
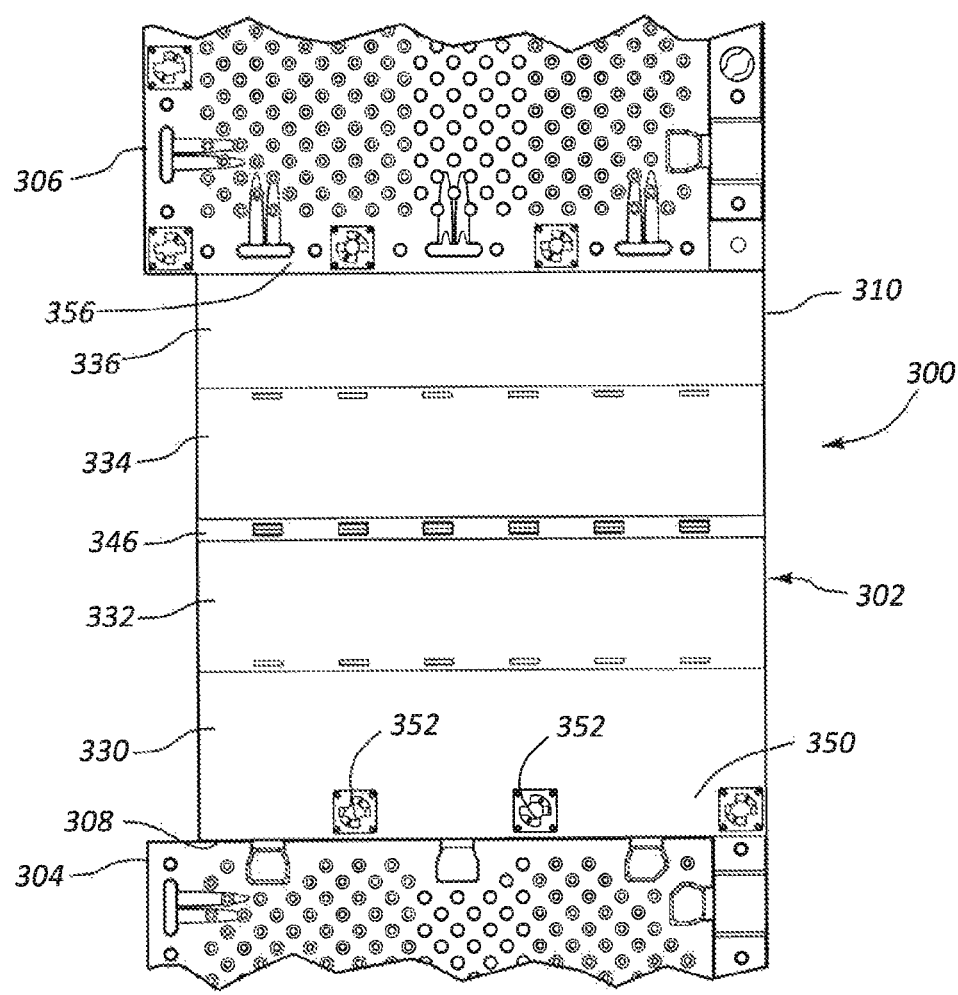
FIG. 17 is a bottom view of the cable protector and floor panels of FIG. 15.

Variations of the cable protector 300 may also be implemented, such as embodiments where the cable protector 300 comprises a base portion 302 with modular base portions 330, 332, 334, 336 and a bridge connector strip 346 similar to the other modular base portions 130, 132, 134, 136, 230, 232, 234, 236 disclosed herein. In some cases, the first side 308 may differ in height from the second side 310 of the base portion 302. Thus, the slopes of the cover panels 314 may differ on each side of the cable protector 300 to bridge between lower and higher surfaces. Additionally, the first side 308 may provide a different type of panel interface portion 350 than the panel interface portion 351 on the other side 310 of the base portion 302. For example, panel interface portion 350 may be connectable to a cam-based system (as shown in FIG. 14), but panel interface portion 351 may be connectable to an interlocking parts system. Thus, the cable protector 300 may be connectable to different types of adjacent floor panels 304, 306 on each side 308, 310. In embodiments with a modular base portion 302, one modular base portion (e.g., 330) may be assembled to the base portion 302 to connect to one type of adjacent floor panel and another modular base portion (e.g., 336) may attached to the base portion to enable connection to an adjacent floor panel that has different characteristics. One situation where this may be useful is in a transition area between floor panels configured for pedestrians and floor panels configured for vehicle traffic, since vehicle-supporting panels are typically more rugged and taller than foot traffic panels. Thus, the cable protector 300 may be highly configurable to protect cables between a multitude of different kinds of surfaces and floor panels.

Another aspect of the disclosure may include a method of protecting cables between adjacent raised surfaces. The method may comprise positioning a base member on a ground surface between a first surface and a second surface, with the first and second surfaces being raised relative to the ground surface. The base member may have a first cable channel covered by a first cover plate and a second cable channel covered by a second cover plate. The method may also comprise moving the first cover plate to expose the first cable channel, positioning a first cable in the first cable channel, moving the second cover plate to expose the second cable channel, and positioning a second cable in the second cable channel, then moving the first and second cover plates to cover the first and second cable channels. The first and second cover plates may rest on the base member on each of the sides of their respective first and second cable channels and may be positioned at least partially above the respective first and second surfaces.

In some cases, the first surface is on a first floor panel, and the method further comprises attaching the base member to the first floor panel. The first and second cover plates may be moved into non-orthogonal positions (e.g., slopes) relative to the ground surface when resting on the base member. Moving the first and second cover plates may comprise rotating the first and second cover plates relative to the base member.

The base member may comprise a first base portion and a second base portion, with the first and second base portions being separable from each other. In this case, the method may further comprise separating the first and second base portions from each other and attaching the first and second base portions to opposite sides of a third base portion.

The base member may also comprise a first base portion having a first length and a second base portion having a second length, wherein the method may further comprise attaching the first and second base portions to each other in a relatively staggered position. The method may also include laterally moving the base member between the first and second surfaces while covering the ground surface with the first and second cover plates.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A cable protector for positioning between floor panels, the cable protector comprising:
    a base portion having at least one receptacle channel configured to receive a cable, the at least one receptacle channel being positioned between a first side ridge and a second side ridge, the first and second side ridges extending vertically to different heights relative to the at least one receptacle channel;
    a cover panel mounted to the base portion and supported by the first and second side ridges, the cover panel covering the at least one receptacle channel at a non-orthogonal angle with respect to a vertical direction.

2. The cable protector of claim 1, wherein the at least one receptacle channel runs longitudinally along the base portion.

3. The cable protector of claim 1, wherein the base portion comprises a plurality of receptacle channels configured to receive a plurality of cables, the cover panel being supported by at least one side ridge positioned between the plurality of receptacle channels.

4. The cable protector of claim 1, wherein the base portion has a first width and the cover panel has a second width, the second width being greater than the first width.

5. The cable protector of claim 1, wherein the cover panel comprises an outer end configured to rest on or adjacent to an adjacent floor panel while the cover panel is supported by the first and second side ridges.

6. The cable protector of claim 1, wherein the cover panel is mounted to the base portion by a rotatable hinge, wherein rotating the cover panel around the rotatable hinge exposes the at least one receptacle channel.

7. The cable protector of claim 1, wherein the base portion is configured to attach to an adjacent floor panel.

8. The cable protector of claim 1, wherein the base portion is configured to attach to an adjacent base portion of an adjacent second cable protector.

9. A flooring system for protecting cables between raised floor panels having different heights, the flooring system comprising:
a base portion having a first end and a second end, the base portion having a first channel and a second channel positioned between the first and second ends, the first and second channels being configured to receive cables;
a first cover panel movably attached to the base portion, the first cover panel covering the first channel, the first cover panel having a first upper surface, the first upper surface having a first slope;
a second cover panel movably attached to the base portion, the second cover panel covering the second channel, the second cover panel having a second upper surface, the second upper surface having a second slope;
wherein the first slope is greater than the second slope.

10. The flooring system of claim 9, wherein the base portion comprises a plurality of modular cable channel members, the plurality of modular cable channel members being removably connected to each other, the first channel and second channel each being in different cable channel members of the plurality of modular cable channel members.

11. The flooring system of claim 10, wherein at least two of the plurality of modular cable channel members are removably connected to a bridging connector member positioned between the at least two cable channel members.

12. The flooring system of claim 10, wherein at least two of the plurality of modular cable channel members are removably connected to each other at relatively staggered longitudinal positions.

13. The flooring system of claim 9, further comprising a first floor panel and a second floor panel, the base portion being positioned between the first and second floor panels, the first cover panel extending over the first floor panel, the second cover panel extending over the second floor panel.

14. The flooring system of claim 13, wherein one of the first and second floor panels is taller than the other.

15. The flooring system of claim 9, wherein the first cover panel contacts the base portion on each side of the first channel and the second cover panel contacts the base portion on each side of the second channel.

16. The flooring system of claim 9, wherein the first and second cover panels are rotatably attached to the base portion by respective first and second hinges.

17. The flooring system of claim 16, wherein the first cover panel extends away from the first and second hinges.

18. The flooring system of claim 16, wherein the first cover panel extends away from the first hinge and toward the second hinge.

19. A method of protecting cables between adjacent raised surfaces, comprising:
positioning a base member on a ground surface between a first surface and a second surface, the first and second surfaces being raised relative to the ground surface, the base member having a first cable channel covered by a first cover plate and a second cable channel covered by a second cover plate, the base member having a first width, the first cover plate having a second width, the second width being greater than the first width;
moving the first cover plate to expose the first cable channel;
positioning a first cable in the first cable channel;
moving the second cover plate to expose the second cable channel;
positioning a second cable in the second cable channel;
moving the first cover plate to cover the first cable channel, to rest on the base member on each side of the first cable channel, and to be positioned at least partially above the first surface;
moving the second cover plate to cover the second cable channel, to rest on the base member on each side of the second cable channel, and to be positioned at least partially above the second surface.

20. The method of claim 19, wherein the first surface is on a first floor panel, the method further comprising:
attaching the base member to the first floor panel.

21. The method of claim 19, wherein the first and second cover plates are moved into non-orthogonal positions relative to the ground surface when resting on the base member.

22. The method of claim 19, wherein moving the first and second cover plates comprises rotating the first and second cover plates relative to the base member.

23. The method of claim 19, wherein the base member comprises a first base portion and a second base portion, the first and second base portions being separable from each other, the method further comprising:
separating the first and second base portions from each other;
attaching the first and second base portions to opposite sides of a third base portion.

24. The method of claim 19, wherein the base member comprises a first base portion having a first length and a second base portion having a second length, the method further comprising attaching the first and second base portions to each other in a relatively staggered position.

25. The method of claim 19, further comprising laterally moving the base member between the first and second surfaces while covering the ground surface with the first and second cover plates.

26. A method of manufacturing a cable protector for positioning adjacent to a floor panel, the method comprising:
providing a base portion and a cover panel, the base portion having a hinge and a channel positioned between ridges, the cover panel being attachable to the hinge to cover the channel over the ridges;
determining a slope between the hinge and a top surface of an adjacent floor panel;
forming the ridges to abut an underside of the cover panel while the cover panel is at the slope determined;
attaching the cover panel to the hinge;
positioning the cover panel at the slope determined while abutting the ridges.

27. A method of protecting a ground surface using a cable protector positioned between ground protection panels, the method comprising:
determining a distance between a first and a second ground protection panel;
configuring a width of a cable protector to have a base portion that fits within the distance between the first and second ground protection panels and to have an upper surface that is greater in width than the distance between the first and second ground protection panels, wherein the upper surface is greater in width than the base portion.

28. A method of protecting cables between adjacent raised surfaces, comprising:
    positioning a base member on a ground surface between a first surface and a second surface, the first and second surfaces being raised relative to the ground surface, the base member having a first cable channel covered by a first cover plate and a second cable channel covered by a second cover plate;
    moving the first cover plate to expose the first cable channel;
    positioning a first cable in the first cable channel;
    moving the second cover plate to expose the second cable channel;
    positioning a second cable in the second cable channel;
    moving the first cover plate to cover the first cable channel, to rest on the base member on each side of the first cable channel, and to be positioned at least partially above the first surface;
    moving the second cover plate to cover the second cable channel, to rest on the base member on each side of the second cable channel, and to be positioned at least partially above the second surface;
    wherein the first and second cover plates are moved into non-orthogonal positions relative to the ground surface when resting on the base member.

29. A method of protecting cables between adjacent raised surfaces, comprising:
    positioning a base member on a ground surface between a first surface and a second surface, the first and second surfaces being raised relative to the ground surface, the base member having a first cable channel covered by a first cover plate and a second cable channel covered by a second cover plate;
    moving the first cover plate to expose the first cable channel;
    positioning a first cable in the first cable channel;
    moving the second cover plate to expose the second cable channel;
    positioning a second cable in the second cable channel;
    moving the first cover plate to cover the first cable channel, to rest on the base member on each side of the first cable channel, and to be positioned at least partially above the first surface;
    moving the second cover plate to cover the second cable channel, to rest on the base member on each side of the second cable channel, and to be positioned at least partially above the second surface;
    laterally moving the base member between the first and second surfaces while covering the ground surface with the first and second cover plates.

* * * * *